United States Patent
Schumacher et al.

(10) Patent No.: US 9,689,418 B2
(45) Date of Patent: Jun. 27, 2017

(54) REDUCED-CORROSION FASTENED ASSEMBLY

(75) Inventors: William A. Schumacher, South Lyon, MI (US); Louis Meli, Sterling Heights, MI (US); Shawn G. Quinn, Grand Blanc, MI (US); Brian J. Schachermeyer, Sterling Heights, MI (US); Milind S. Gandhi, Shelby Township, MI (US); David B. DeClerck, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1801 days.

(21) Appl. No.: 12/968,469

(22) Filed: Dec. 15, 2010

(65) Prior Publication Data

US 2012/0155988 A1    Jun. 21, 2012

(51) Int. Cl.
  *F16B 33/00*    (2006.01)
  *F16B 5/02*    (2006.01)
  *F16B 31/02*    (2006.01)
  *F16B 33/06*    (2006.01)

(52) U.S. Cl.
  CPC .......... *F16B 33/008* (2013.01); *F16B 5/0258* (2013.01); *F16B 31/02* (2013.01); *F16B 33/06* (2013.01); *F16B 5/02* (2013.01)

(58) Field of Classification Search
  USPC ............ 411/366.1–370, 914; 403/388, 408.1
  See application file for complete search history.

(56) References Cited

U.S. PATENT DOCUMENTS

| 255,043 | A | * | 3/1882 | Smith | 174/2 |
|---|---|---|---|---|---|
| 2,723,048 | A | * | 11/1955 | Welch | 220/681 |
| 2,779,729 | A | * | 1/1957 | Jorgensen | 204/196.11 |
| 2,915,152 | A | * | 12/1959 | Graham | 403/288 |
| 2,939,805 | A | * | 6/1960 | Johnson | 411/258 |
| 3,252,215 | A | * | 5/1966 | De Long et al. | 29/458 |
| 3,485,132 | A | * | 12/1969 | Hanny et al. | 411/548 |
| 3,639,137 | A | * | 2/1972 | Marinelli | 428/321.5 |
| 4,074,491 | A | * | 2/1978 | Bell et al. | 52/394 |
| 4,244,661 | A | * | 1/1981 | Dervy | 403/243 |

(Continued)

FOREIGN PATENT DOCUMENTS

DE    19835695 A1    2/2000
GB    1356051    6/1974

*Primary Examiner* — Flemming Saether
(74) *Attorney, Agent, or Firm* — Quinn IP Law

(57) ABSTRACT

A reduced-corrosion assembly includes a first and a second component joined by a fastener having a head and a body. A coating covers a section of the body. The assembly also includes a washer, a compression limiter, and a nut arranged on the first component and adapted to engage the fastener body to thereby tighten the assembly. When the assembly is tightened, the compression limiter is arranged on the fastener body between the first and second components, while the second component is arranged on the fastener body between the compression limiter and the washer. Furthermore, the washer is arranged on the fastener body between the fastener head and the second component, while the coating covers the body substantially up to where the nut engages the body such that corrosion of the assembly is limited or reduced. A vehicle employing the reduced-corrosion fastening system is also provided.

18 Claims, 2 Drawing Sheets

(56) References Cited

U.S. PATENT DOCUMENTS

| | | | | |
|---|---|---|---|---|
| 4,306,708 | A * | 12/1981 | Gassaway et al. | 267/141.3 |
| 4,834,569 | A * | 5/1989 | Foote et al. | 403/2 |
| 4,941,769 | A * | 7/1990 | Natsume | 403/408.1 |
| 5,139,361 | A * | 8/1992 | Camuffo | 403/408.1 |
| 5,308,285 | A * | 5/1994 | Malen et al. | 470/4 |
| 5,447,399 | A * | 9/1995 | Yoshida et al. | 411/383 |
| 5,525,001 | A * | 6/1996 | Perkins | 403/157 |
| 6,227,784 | B1 * | 5/2001 | Antoine et al. | 411/369 |
| 6,394,537 | B1 * | 5/2002 | DeRees | 296/191 |
| 6,582,172 | B2 * | 6/2003 | Nickerson et al. | 411/371.1 |
| 6,979,161 | B2 * | 12/2005 | Ando et al. | 411/368 |
| 7,048,265 | B2 * | 5/2006 | Huprikar | 267/141.1 |
| 7,086,688 | B2 * | 8/2006 | Edwards | 296/181.3 |
| 7,121,758 | B2 * | 10/2006 | McMillan et al. | 403/408.1 |
| 7,153,054 | B2 * | 12/2006 | Arbona | 403/28 |
| 7,261,365 | B2 * | 8/2007 | Dickson et al. | 296/190.07 |
| 7,581,913 | B2 * | 9/2009 | Ordonio et al. | 411/542 |
| 7,686,554 | B2 * | 3/2010 | Amann et al. | 411/352 |
| 7,699,571 | B2 * | 4/2010 | Booher et al. | 411/546 |
| 7,708,512 | B2 * | 5/2010 | McLean et al. | 411/533 |
| 7,874,777 | B1 * | 1/2011 | Howie, Jr. | 411/368 |
| 8,403,612 | B2 * | 3/2013 | Wright et al. | 411/367 |
| 2005/0053419 | A1 * | 3/2005 | McMillan et al. | 403/2 |
| 2005/0074276 | A1 * | 4/2005 | Luetze et al. | 403/14 |
| 2006/0210357 | A1 * | 9/2006 | Breitfeld et al. | 403/408.1 |
| 2008/0095593 | A1 * | 4/2008 | McLean et al. | 411/360 |
| 2008/0118329 | A1 * | 5/2008 | Amann et al. | 411/369 |
| 2011/0120257 | A1 * | 5/2011 | Hayashi et al. | 74/551.1 |
| 2012/0155988 | A1 * | 6/2012 | Schumacher et al. | 411/369 |

\* cited by examiner

REDUCED-CORROSION FASTENED ASSEMBLY

TECHNICAL FIELD

The invention relates to a reduced-corrosion fastened assembly.

BACKGROUND

A fastener is a hardware device that mechanically affixes or joins two or more objects. A threaded fastener is a discrete piece of hardware that has internal or external screw threads. Threaded fasteners are typically used to position objects, to create assemblies by holding together multiple components, and also to facilitate disassembly. The most common types of threaded fasteners are a screw and a nut.

A screw or a bolt is a type of fastener characterized by a helical ridge, known as an external thread wrapped around a cylinder. Some screw threads are designed to mate with a complementary thread, known as an internal thread, often in the form of an object that has the internal thread formed into the object, or a nut. The screw and nut pairing are generally kept together by a combination of friction between the mating threads, a slight stretch of the screw, and compression of the components in the assembly.

In applications where a fastened assembly is exposed to the elements, corrosion of the fastening hardware is a cause for concern. One type of corrosion that may affect the fastening hardware is galvanic corrosion. Galvanic corrosion is an electrochemical process in which one metal corrodes preferentially when in electrical contact with a different type of metal and both metals are immersed in an electrolyte.

When two or more different types of metal come into contact in the presence of an electrolyte, a galvanic couple may be generated due to different electrode potentials of the different metals. The electrolyte provides a means for ion migration, whereby metallic ions can move from the anode to the cathode of the galvanic couple. Such a process typically leads to the anodic metal corroding more quickly than it otherwise would, while the corrosion of the cathodic metal is retarded, even to the point of stopping. The presence of electrolyte and a conducting path between the different metal components may cause corrosion where otherwise neither metal component alone would have corroded. Even a single type of metal may corrode galvanically, if the electrolyte varies in composition, thus forming a concentration cell.

Accordingly, design of the fastening system and selection of the component materials in the assembly with an eye toward reducing galvanic corrosion may prove critical to the reliability of the subject assembly.

SUMMARY

A reduced-corrosion assembly includes a first component and a second component joined by a fastener formed from a first material. The fastener has a head and a body with a threaded first portion. A coating covers a section of the body. The assembly also includes a washer formed from a second material, a compression limiter, and a nut arranged on the first component and adapted to engage the threaded first portion of the fastener body to thereby tighten the assembly. When the assembly is tightened, the compression limiter is arranged on the fastener body between the first component and the second component, while the second component is arranged on the fastener body between the compression limiter and the washer. Furthermore, the washer is arranged on the fastener body between the fastener head and the second component, while the coating covers the threaded first portion substantially up to where the nut engages the first portion such that corrosion of the assembly is limited or reduced.

The assembly may also include a sleeve arranged on the fastener body. The sleeve may be configured to be displaced and thereby fill a space between the head and the nut when the assembly is tightened and provide an internal moisture seal. The sleeve may be formed from a polymeric material.

The nut may be fixed on the first component, such as by welding. The fastener body may include a non-threaded second portion such that the second portion is disposed between the head and the first portion. The coating may also cover the second portion of the fastener.

Additionally, the first material may be steel, while the second material may be aluminum. Furthermore, the second component may be formed from magnesium, while the first component may be formed from steel.

The compression limiter may be embedded in a third component and adapted to protect the third component from being damaged when the assembly is tightened. The third component may be formed from plastic.

A vehicle employing the reduced-corrosion assembly is also provided.

The above features and advantages and other features and advantages of the present invention are readily apparent from the following detailed description of the best modes for carrying out the invention when taken in connection with the accompanying drawings.

DETAILED DESCRIPTION

Figure 1:
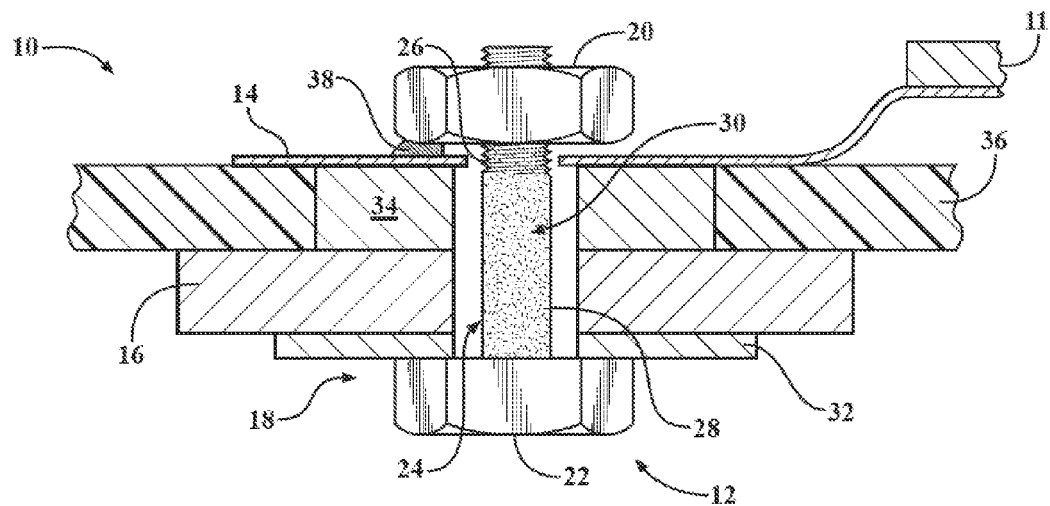
FIG. 1 is a schematic cross-sectional view of a section of a vehicle that includes a fastened assembly of components.

Referring to the drawings, wherein like reference numbers refer to like components, FIG. 1 shows a perspective view of a section of a vehicle 10. The vehicle 10 includes a frame 11, and a limited or reduced corrosion assembly 12 mounted on the frame. The assembly 12 includes a first component 14, which may be a vehicle body panel. The first component 14 may be formed from steel which may also be galvanized and/or painted to resist corrosion. The assembly 12 also includes a second component 16, which may be any part that is sought to be attached to the first component 14 to achieve necessary support and be enabled to perform a function. As illustrated in FIG. 1, the second component 16 may be formed from magnesium, thus chosen for magnesium's advantageous strength to mass ratio. In the vehicle 10, the second component 16 may be a tray for an energy storage device, such as a battery (not shown).

The assembly 12 also includes a fastener, which is shown as a bolt 18, and a nut 20. The bolt 18 and the nut 20 may each be formed from alloyed carbon steel for strength. The bolt 18 and the nut 20 may each additionally incorporate a protective layer to reduce the susceptibility of the bolt and nut to corrosion. For example, the bolt 18 and the nut 20 may be dipped in zinc because of zinc's ability to form a protective layer of the basic zinc carbonate by reaction with atmospheric carbon dioxide. After formation, such a zinc carbonate layer helps prevent further reaction of the base material with air and water.

The bolt 18 includes a head 22 and a body 24. The body 24 includes a threaded first portion 26, and a non-threaded second portion 28. As shown in FIG. 1, the second portion 28 of the bolt 18 is disposed between the head 22 and the first portion 26. The nut 20 includes a thread that is complementary to the thread that is provided on the first portion 26. Hence, the nut 20 is adapted to engage the first portion 26 to thereby tighten the assembly 12. A coating 30 covers a section of the first portion 26, and may also be employed to cover the second portion 28. The coating 30 covers the first portion 26 substantially up to where the nut 20 engages the first portion 26 after the bolt 18 and the nut are tightened. The use of coating 30 only up to the area of engagement of the first portion 26 and the nut 20 is specified in order to reduce corrosion of the first portion while preventing the impact of the coating on the tightening torque of the bolt 18 and the nut 20.

A washer 32 is disposed on the body 24. The washer 32 is a type of a plate that may be characterized by a general disk-shape having a hole. As known by those skilled in the art, the washer 32 may be used as a spacer, as well as to distribute the load of the bolt 18 when the bolt is tightened. The washer 32 is formed from a second material, which, as employed in the assembly 12, may be aluminum. Aluminum may be chosen as the material for the washer 32 in order to reduce the potential for corrosion, and to reduce the mass of the assembly 12. Aluminum possesses a significant corrosion resistance due to a thin surface layer of aluminum oxide or hydroxide, i.e., a passive layer that commonly forms when the metal is exposed to air, effectively preventing further oxidation. Such corrosion resistance may, however, be greatly reduced when a large concentration of aqueous salts is present, particularly in the presence of dissimilar metals.

A compression limiter 34 is additionally employed in the assembly 12. The compression limiter 34 is embedded in a third component 36. The component 36 is made from a relatively soft material, such as plastic. In the vehicle 10, if the second component 16 is a tray for the energy storage device, such as described above, the third component 36 may be a plastic cover for such a tray. The compression limiter 34 is a rigid device that protects the third component 36 from being damaged by a fastener load generated via tightening of the assembly 12 via the bolt 18 and the nut 20. Material for the compression limiter 34 is typically chosen such that the compression limiter remains generally incompressible under the expected load. Damage to the third component 36 is thereby avoided by transferring the fastener load solely through the structure of the compression limiter. When the assembly 12 is tightened, the compression limiter 34, along with the third component 36 is arranged on the fastener body between the first component 14 and the second component 16. Aluminum may be chosen as the material for the compression limiter 34 in order to reduce the potential for corrosion, and to additionally reduce the mass of the assembly 12.

The nut 20 is arranged on the first component 14. Additionally, the nut 20 may be fixed to the first component 14 by any appropriate process such as welding. As shown in FIG. 1, if the nut 20 is fixed on the first component by welding, appropriate projections 38, also known as weld nibs or bosses, maybe used to keep the nut from misaligning while being welded, and to limit the required weld energy. When the assembly 12 is tightened, the second component 16 is arranged on the fastener body 24 between the compression limiter 34 and the washer 32. Furthermore, in the tightened assembly 12, the washer 32 is arranged on the fastener body 24 between the head 22 and the second component 16.

When the assembly 12 is exposed to the elements, moisture may penetrate the joint. Such a situation is especially likely when the welded nut 20 is employed. Upon penetration of the assembly 12, the moisture is likely to become trapped and remain inside the assembly. Consequently, such moisture may form an electrolyte that may then lead to galvanic corrosion between the magnesium second component 16 and the first component 14, the bolt 18, and nut 20, that are all made out of steel. Crevice-type of galvanic corrosion is especially likely to develop if a protective surface of any of the first component 14, the bolt 18, and the nut 20 develops a scratch, thus exposing areas of bare metal. As noted above, the selection of appropriate alloy of aluminum that is low in impurities, such as copper, nickel and iron, for the washer 32 and the compression limiter 34 generally keeps the washer and the compression limiter from being electrically conductive, and, thus, from chemically reacting with the magnesium of the second component 16.

Furthermore, from the galvanic corrosion resistance stand-point, the selection of appropriate coatings for the steel first component 14, the bolt 18, and nut 20, only creates a stable situation when acidity or pH level of the moisture trapped inside the assembly 12 is near neutral, i.e., around a value of 7. When the surrounding environment is stagnant the trapped moisture may develop local pH changes. Thus, such a situation tends to generate both acidic and alkaline portions within the stagnant pool of water inside assembly 12. If the pH level of stagnant water increases past a value of 10, the passive layer of aluminum may dissolve, and the surface of the washer 32 and the compression limiter 34 may become conductive for galvanic current with respect to the magnesium of the second component 16. Consequently, the rate of galvanic corrosion of the magnesium second component 16 will greatly increase.

Figure 2:
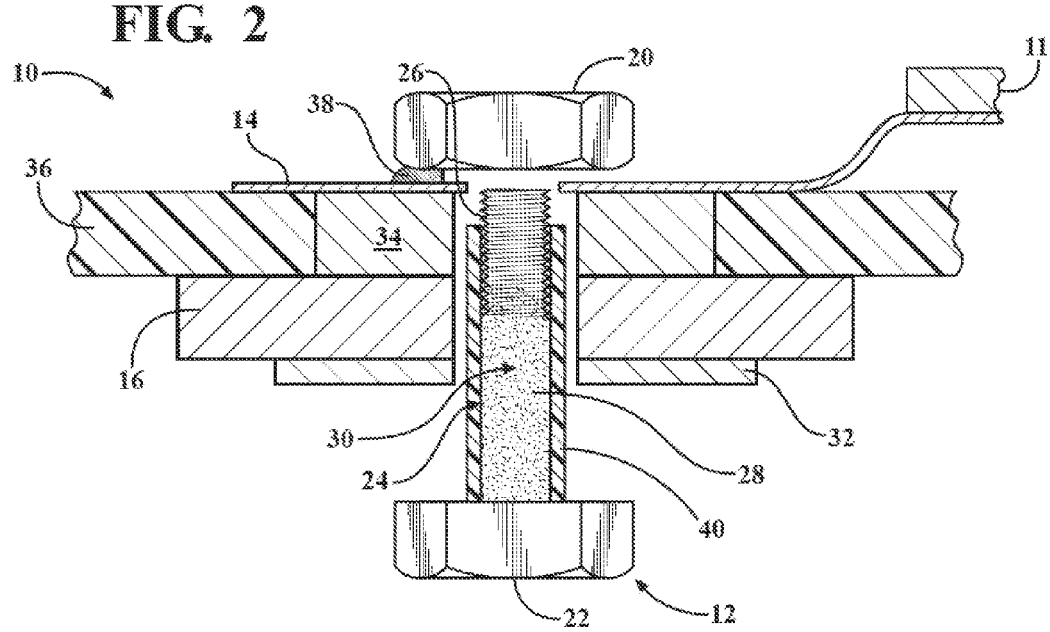
FIG. 2 is a cross-sectional view of the assembly prior to being tightened, wherein the assembly additionally includes a displaceable pliant sleeve.
Figure 3:
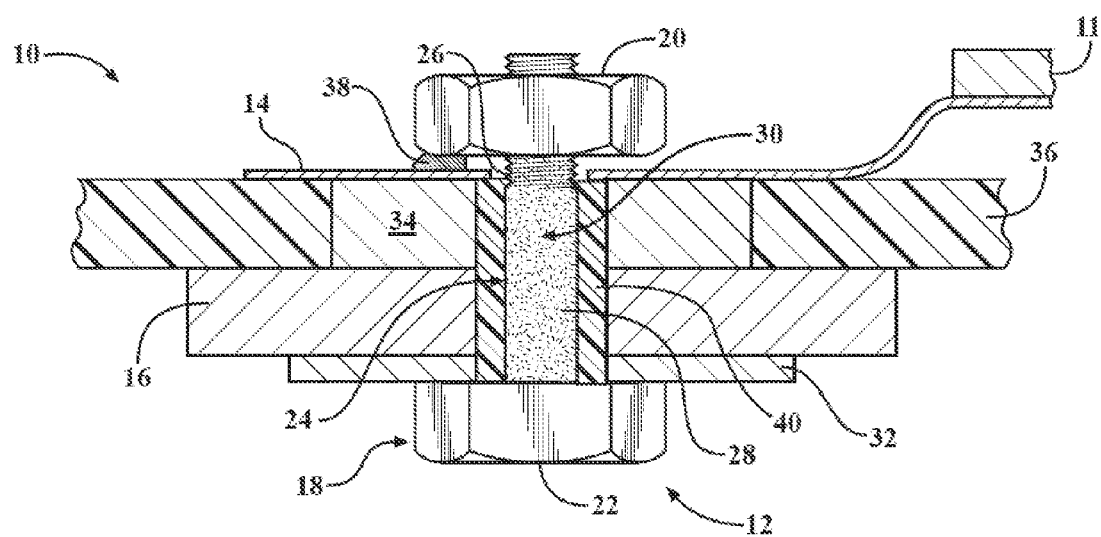
FIG. 3 is a cross-sectional view of the assembly shown in FIG. 2 in a tightened state.

As shown in FIG. 2, the assembly 12 may additionally include a pliant sleeve 40. The sleeve 40 is arranged on the fastener body 24 and is configured to be displaced and thereby fill a space between the head 22 and the nut 20 when the assembly 12 is tightened. The sleeve 40 starts out having a specifically chosen length that is greater than the height of the space between the head 22 and the nut 20. Because the sleeve 40 is formed from a pliant material, although the sleeve starts out having a length that is greater than the height of the space between the head 22 and the nut 20, the sleeve will deform and fill any vacant space around the body 24 and threads 26 when the assembly 12 is tightened. By taking up the otherwise empty space around the body 24 and threads 26 of the bolt 18, the sleeve 40 is thereby configured to prevent moisture from collecting inside the assembly 12 when the assembly is tightened. The sleeve 40 may be formed from a polymeric material, such as an injection moldable plastic or rubber. The sleeve 40 may be combined with the use of the coating 30, wherein the seal is used to take up assembly clearance and provide an internal moisture seal.

Overall, the combination of the magnesium second component 16, the steel first component 14, bolt 18, and nut 20 having the coating 30, the aluminum washer 32 and the compression limiter 34, as well as the optional use of the pliant polymeric sleeve 40, provides the limited or reduced corrosion assembly 12.

While the best modes for carrying out the invention have been described in detail, those familiar with the art to which this invention relates will recognize various alternative designs and embodiments for practicing the invention within the scope of the appended claims.

The invention claimed is:

1. A reduced-corrosion assembly comprising:
a first component;
a second component;
a fastener formed from a first material, the fastener having a fastener head and a fastener body that includes a threaded first portion;
a coating that covers a section of the threaded first portion;
a washer formed from a second material;
a nut arranged on the first component and adapted to engage the threaded first portion of the body to thereby tighten the assembly;
a compression limiter adapted to transfer a load from the fastener when the assembly is tightened; and
a sleeve arranged on the fastener body, wherein the sleeve is configured to be displaced and thereby fill a space between the head and the nut when the assembly is tightened;
wherein when the assembly is tightened:
the compression limiter is arranged on the fastener body between the first component and the second component;
the second component is arranged on the fastener body between the compression limiter and the washer;
the washer is arranged on the fastener body between the fastener head and the second component; and
the coating covers the threaded first portion substantially up to, but not including where the nut engages the threaded first portion, such that galvanic corrosion of the assembly is limited.

2. The assembly of claim 1, wherein the sleeve is formed from a polymeric material.

3. The assembly of claim 1, wherein the nut is fixed on the first component.

4. The assembly of claim 1, wherein the fastener body includes a non-threaded second portion disposed between the head and the first portion.

5. The assembly of claim 4, wherein the coating covers the second portion of the fastener.

6. The assembly of claim 1, wherein the first material is steel and the second material is aluminum.

7. The assembly of claim 1, wherein the first component is formed from steel and the second component is formed from magnesium.

8. The assembly of claim 1, wherein the compression limiter is embedded in a third component and adapted to protect the third component from being damaged when the assembly is tightened.

9. The assembly of claim 8, wherein the third component is formed from plastic.

10. A vehicle comprising:
a vehicle frame; and
a reduced-corrosion assembly mounted on the frame, the assembly including:
a first component;
a second component;
a fastener formed from a first material, the fastener having a fastener head and a fastener body that includes a threaded first portion;
a coating that covers a section of the threaded first portion;
a washer formed from a second material;
a nut arranged on the first component and adapted to engage the threaded first portion of the fastener body to thereby tighten the assembly;
a compression limiter adapted to transfer a load from the fastener when the assembly is tightened; and
a sleeve arranged on the fastener body, wherein the sleeve is configured to be displaced and thereby fill a space between the head and the nut when the assembly is tightened;
wherein when the assembly is tightened:
the compression limiter is arranged on the fastener body between the first component and the second component;
the second component is arranged on the fastener body between the compression limiter and the washer;
the washer is arranged on the fastener body between the fastener head and the second component; and
the coating covers the threaded first portion substantially up to, but not including where the nut engages the threaded first portion, such that galvanic corrosion of the assembly is limited.

11. The vehicle of claim 10, wherein the sleeve is formed from a polymeric material.

12. The vehicle of claim 10, wherein the nut is fixed on the first component.

13. The vehicle of claim 10, wherein the fastener body includes a non-threaded second portion disposed between the head and the first portion.

14. The vehicle of claim 13, wherein the coating covers the second portion of the fastener.

15. The vehicle of claim 10, wherein the first material is steel and the second material is aluminum.

16. The vehicle of claim 10, wherein the first component is formed from steel and the second component is formed from magnesium.

17. The vehicle of claim 10, wherein the compression limiter is embedded in a third component.

18. The vehicle of claim 17, wherein the third component is formed from plastic.

* * * * *